United States Patent [19]

Heithoff

[11] Patent Number: 5,030,593

[45] Date of Patent: Jul. 9, 1991

[54] LIGHTLY TINTED GLASS COMPATIBLE WITH WOOD TONES

[75] Inventor: Robert B. Heithoff, LaVale, Md.

[73] Assignee: PPG Industries, Inc., Pittsburgh, Pa.

[21] Appl. No.: 545,723

[22] Filed: Jun. 29, 1990

[51] Int. Cl.$^5$ .............................................. C03C 3/078
[52] U.S. Cl. ........................................ 501/72; 501/70; 501/71
[58] Field of Search ............................ 501/70, 71, 72

[56] References Cited

U.S. PATENT DOCUMENTS

| | | | |
|---|---|---|---|
| 3,296,004 | 1/1967 | Duncan | 106/52 |
| 3,330,638 | 7/1967 | Brown | 501/71 X |
| 3,723,142 | 3/1973 | Kato et al. | 501/71 |
| 4,101,705 | 7/1978 | Fischer et al. | 428/220 |
| 4,104,076 | 8/1978 | Pons | 501/71 X |
| 4,190,452 | 2/1980 | Fischer et al. | 106/52 |
| 4,339,541 | 7/1982 | DelaRuye | 501/71 |
| 4,792,536 | 12/1988 | Pecoraro et al. | 501/70 |
| 4,866,010 | 9/1989 | Boulous et al. | 501/71 |

FOREIGN PATENT DOCUMENTS

| | | | |
|---|---|---|---|
| 618642 | 4/1961 | Canada | 501/71 |
| 1141417 | 12/1962 | Fed. Rep. of Germany | 501/71 |

Primary Examiner—Karl Group
Attorney, Agent, or Firm—Dennis G. Millman

[57] ABSTRACT

A clear glass, with the substantial absence of color in transmittance, and with an attractive, bright, edge coloration compatible with wood tone surroundings is achieved in a glass having greater than 85 percent, preferably greater than 87 percent, luminous transmittance by minimizing the amount of iron oxide present in the glass and including very small amounts of selenium and (optionally) cobalt oxide. Various warm, wood tone compatible colors at the edge can be attained, including a "honey" color and almost neutral grays.

7 Claims, No Drawings

LIGHTLY TINTED GLASS COMPATIBLE WITH WOOD TONES

BACKGROUND OF THE INVENTION

This invention relates to glass compositions and products that are useful, for example, in furniture applications such as table tops or shelving. In particular, the glasses of this invention provide an edge coloration that is compatible with wood tones. In such a setting, it is usually desired for the glass to be as free of color as possible so that the glass does not alter the appearance of the furniture, carpets, or other objects viewed through the glass. However, because of the elongated view path, a pronounced color usually shows at the edge of glass that is otherwise considered clear. In conventional clear glass, the edge color is green due to the presence of iron oxide in the glass. Iron oxide is deliberately added to most flat glass, but even when it is not, sufficient amounts to produce a green coloration are usually present as impurities from the raw materials from which the glass is melted. The green edge color may not be compatible with the decor of the room or with the other portions of the furniture of which the glass is a part.

Additionally, with a sheet of ordinary clear glass having typical dimensions of a shelf or a table top, the green color at the edge is very dark and does little to enhance the attractiveness of the piece. Including colorants in the glass can produce tinted glass of blue, gray, bronze, or other colors, but the accompanying reduction of transmittance has the effect of darkening the edge even more, in some cases rendering the edge essentially black.

Bronze colored glasses that are designed for heat absorption in windows such as those disclosed in U.S. Pat. Nos. 3,296,004 (Duncan); 4,190,452 (Fischer et al.); and 4,101,705 (Fischer et al.) have a color when viewed through the glass that is compatible with some wood tone surroundings, but suffer two drawbacks. First, visibility through the glass is relatively low, luminous transmittance usually being considerably lower than 80 percent at a standard thickness of 5 millimeters for those versions intended for automotive use, and typically lower than 65 percent for architectural bronze glass. The transmittance would be expected to be even lower at the larger thicknesses typical of some furniture applications. Second, the low luminous transmittance results in an edge appearance that is almost black. It would be desirable to have available glass that has a colorful but bright edge appearance that is compatible with wood tone surroundings.

It is known to produce glass that is almost colorless by selecting raw materials that have very little iron and by including cerium oxide in the glass to "decolorize" the remaining traces of iron. Cerium oxide is a powerful oxidizing agent in glass, and its function in decolorized glass is to oxidize the iron to the ferric state, which is a less powerful colorant and which shifts the transmittance spectrum of the glass toward yellow and away from the usual green-blue effect of iron in glass. The edge of this decolorized glass does not have the conventional green color, but it can have a slightly yellow appearance, and the presence of contaminants in the cerium oxide source material can sometimes produce a dull appearance at the edge. This is considered by some to be a less than attractive appearance for accompanying wooden furniture or the like. Even more objectionable for some intended uses is the fact that the presence of cerium oxide causes fluorescence of the edge portion of the glass under sunlight or certain artificial lighting conditions having a significant ultraviolet component. The fluorescence is exhibited as a vivid violet color at the edge. This is considered by some to be objectionable for color coordination purposes.

It would be desirable to have available highly transparent glass with a pleasing edge appearance in colors other than green, and in particular it would be desirable to have a bright edge color that is compatible with wood tones.

SUMMARY OF THE INVENTION

The present invention is a group of highly transparent glasses with bright, attractive edge colors that present a pleasing appearance compatible with wooden surroundings, and offers alternatives not previously available for glass components of furniture and other specialty applications. The appearance of the edge of the preferred examples can be described as "honey colored," but a spectrum of colors can be achieved by the present invention ranging from almost neutral gray to pale amber to red-brown shades. A color that coordinates with almost any natural wood color can be produced. The effect is achieved by limiting the presence of iron oxide to very small amounts and using only trace amounts of additional colorants, thereby maintaining very high transmittance of visible light. The other colorants include selenium and (optionally) cobalt oxide. Cobalt oxide is needed in minor amounts only in those cases where a relatively neutral color approaching gray is desired. The high transmittance not only permits a clear, essentially uncolored view of objects through the glass, but also provides a bright, colorful appearance at the edge. The visible light transmittance in the normal direction to a sheet 0.223 inches (5.66 millimeters) thick, expressed as luminous transmittance with illuminant C (C.I.E. international standard) is at least 85 percent, preferably greater than 87 percent, and typically greater than 88 percent. This compares to typical luminous transmittance of standard, clear flat glass of about 87 to 88 percent, and a theoretical maximum luminous transmittance for soda-lime-silica glass of 91.7 percent. Except for the edge coloration, the glass of the present invention can be considered to have a substantial absence of color. Iron oxide concentration in the glass is very low, being less than 0.02 percent by weight (expressed as $Fe_2O_3$), preferably less than 0.015 percent by weight present. Selenium concentrations range from 0.00003 to 0.00020 percent by weight, and cobalt concentrations may be 0 to 0.0003 percent by weight.

DETAILED DESCRIPTION

Conventional glassmaking processes may be used for making the glasses of the present invention. However, due to the relatively small quantities of a particular color that are likely to be needed, a specialized, low volume glass melting and refining operation such as the type disclosed in U.S. Pat. No. 4,792,536 is preferred, although not essential. The overall melting process of the preferred embodiment disclosed in that patent consists of three stages: a liquefaction stage, a dissolving stage, and a vacuum refining stage. Various arrangements could be employed to initiate the melting in the liquefaction stage, but a highly effective arrangement for isolating this stage of the process and carrying it out economically is that disclosed in U.S. Pat. No. 4,381,934 which is hereby incorporated by reference for details of the preferred liquefaction stage embodiment. The basic structure of the liquefaction vessel is a drum which may be fabricated of steel and has a generally cylindrical sidewall portion, a generally open top, and a bottom portion that is closed except for a drain outlet. The drum is mounted for rotation about a substantially vertical axis. A substantially enclosed cavity is formed within the drum by means of a lid structure.

Heat for liquefying the batch material may be provided by one or more burners extending through the lid. Preferably, a plurality of burners are arranged around the perimeter of the lid so as to direct their flames toward a wide area of the material within the drum. The burners are preferably water cooled to protect them from the harsh environment within the vessel.

Batch materials, preferably in a pulverulent state, may be feed into the cavity of the liquefying vessel by means of a chute. A layer of the batch material is retained on the interior walls of the drum aided by the rotation of the drum and serves as insulating lining. As batch material on the surface of the lining is exposed to the heat within the cavity, liquefied material flows down the sloped lining to a central drain opening at the bottom of the vessel. A stream of liquefied material falls freely from the liquefaction vessel through an opening leading to the second stage.

The second stage of the specific embodiment being described may be termed the dissolving vessel because one of its functions is to complete the dissolution of any unmelted grains of batch material remaining in the liquefied stream leaving the liquefaction vessel. The liquefied material at that point is typically only partially melted, including unmelted sand grains and a substantial gaseous phase. In a typical soda-lime-silica melting process using carbonate batch materials, the gaseous phase is chiefly comprised of carbon oxides. Nitrogen may also be present from entrapped air.

The dissolving vessel serves the function of completing the dissolution of unmelted particles in the liquefied material coming from the first stage by providing residence time at a location isolated from the downstream refining stage. Soda-lime-silica glass batch typically liquefies at a temperature of about 2200° F. (1200° C.) and enters the dissolving vessel at a temperature of about 2200° F. (1200° C.) to about 2400° F. (1320° C.), at which temperature residual unmelted particles usually become dissolved when provided with sufficient residence time. The dissolving vessel may be in the form of a horizontally elongated refractory basin with the inlet and outlet at opposite ends thereof so as to assure adequate residence time.

Although the addition of substantial thermal energy is not necessary to perform the dissolving step, heating can expedite the process and thus reduce the size of the dissolving vessel. More significantly, however, it is preferred to heat the material in the dissolving stage so as to raise its temperature in preparation for the refining stage to follow. Maximizing the temperature for refining is advantageous for the sake of reducing glass viscosity and increasing vapor pressure of included gases. Typically a temperature of about 2800° F. (1520° C.) is considered desirable for refining soda-lime-silica glass, but when vacuum is employed to assist refining, lower peak refining temperatures may be used without sacrificing product quality. The amount by which temperatures can be reduced depends upon the degree of vacuum. Therefore, when refining is to be performed under vacuum in accordance with the preferred process, the glass temperature need be raised to no more than 2700° F. (1480° C.), for example, and optionally no more than 2600° F. (1430° C.) prior to refining. When the lower range of pressures disclosed herein are used, the temperature in the refining vessel need be no higher than 2500° F. (1370° C.) in some cases. Peak temperature reductions on this order result in significantly longer life for refractory vessels as well as energy savings. The liquefied material entering the dissolving vessel need be heated only moderately to prepare the molten material for refining. Combustion heat sources may be used in the dissolving stage, but it has been found that this stage lends itself well to electric heating, whereby a plurality of electrodes may be provided. Heat is generated by the resistance of the melt itself to electric current passing between electrodes in the technique conventionally employed to electrically melt glass. The electrodes may be carbon or molybdenum of a type well known to those of skill in the art.

The refining stage preferably consists of a vertically upright vessel that may be generally cylindrical in configuration having an interior ceramic refractory lining shrouded in a gas-tight, water-cooled casing. The structure and process of the preferred vacuum refining stage are those described in U.S. Pat. No. 4,738,938 (Kunkle et al.). A valve fitted to an inlet tube may be used to control the rate at which the molten material enters the vacuum refining vessel. As the molten material passes through the tube and encounters the reduced pressure within the refining vessel, gases included in the melt expand in volume, creating a foam. As foam collapses it is incorporated into the liquid body held in the refining vessel. Distributing the molten material as thin membranes of a foam greatly increases the surface area exposed to the reduced pressure. Therefore, maximizing the foaming effect is preferred. It is also preferred that the foam be exposed to the lowest pressures in the system, which are encountered at the top of the vessel in the headspace above the liquid, and therefore exposure is improved by permitting newly introduced, foamed material to fall through the head space onto the top of the foam layer. Refined molten material may be drained from the bottom of the refining vessel by way of a drain tube of a refractory metal such as platinum. The benefits of vacuum on the refining process are attained by degrees; the lower the pressure, the greater the benefit. Small reductions in pressure below atmospheric may yield measurable improvements, but to economically justify the vacuum chamber, the use of substantially reduced pressures are preferred. Thus, a pressure of no more than one-half atmosphere is preferred for the appreciable refining improvements imparted to soda-lime-silica flat glass. Significantly greater removal of gases is achieved at pressures of one-third atmosphere or less. More specifically, a refining pressure below 100 torr, for example 20 to 50 torr, is preferred to yield commercial float glass quality of about one seed per 1,000–10,000 cubic centimeters. Seeds less than 0.01 millimeter in diameter are considered imperceptible and are not included in the seed counts.

Typically, flat glass batch includes sodium sulfate as a melting and refining aid in the amounts of about 5 to 15 parts by weight per 1000 parts by Typically, flat glass batch includes sodium sulfate as a melting and refining aid in the amounts of about 5 to 15 parts by weight per 1000 parts by weight of the silica source material (sand), with about 10 parts by weight considered desirable to assure adequate refining. When employing vacuum refining in accordance with the specific embodiment being described, however, it has been found feasible to restrict the sodium sulfate to two parts by weight without detrimentally affecting refining. Most preferably, the sodium sulfate is utilized at no more than one part per 1000 parts sand, with one-half part being a particularly advantageous example. These weight ratios have been given for sodium sulfate, but it should be apparent that they can be converted to other sulfur sources by molecular weight ratios.

The vacuum treatment has been found to reduce the concentration of volatile gaseous components, particularly the refining aids such as sulfur, to levels lower than the equilibrium levels attained with conventional processes. Selenium, which is used as a colorant in the present invention, is also relatively volatile and substantial portions of the selenium included with the batch materials are lost during conventional melting and refining. Even larger portions of the selenium are extracted from the molten glass during vacuum refining. Therefore, substantially larger amounts of selenium must be fed to the process than are theoretically required for the coloring purposes of the present invention. In the particular process described here, typical retention of selenium is about 25 percent. The volatilization of selenium from the melt has been found to have some advantage in that it enhances foaming of the melt in vacuum refining and therefore serves to assist the refining process. As a result, vacuum refining can be carried out at higher pressures than usual to retain sufficient selenium without sacrificing refining performance. As an example, at the preferred temperatures disclosed herein, vacuum refining at 40 torr has been found to yield glass having an equlibrium selenium content of 0.0001 percent by weight. To retain larger amounts of selenium in the glass, higher pressures may be utilized in the vacuum refiner. With sufficient quantities of selenium present, pressures as high as about 140 torr were found to be suitable in some cases.

In the preferred arrangement for producing the glass of the present invention, a stirring arrangement may be employed to homogenize the glass after it has been refined in order to produce glass of the highest optical quality. A particular embodiment may include a stirring chamber below the refining vessel within which a stream of glass is received from the refining vessel. The glass is preferably above 2200° F. (1200° C.) during stirring. For purposes of the present invention the stirring arrangement is not limited to any particular structure of stirrer, any of the various mechanical devices that have been proposed for stirring molten glass in the prior art being usable. Some arrangements may be more effective than others in homogenizing the glass, but the number of stirrers and their speed of rotation can be selected to compensate for variations in efficiency. A particular example of a suitable stirrer structure is that disclosed in U.S. Pat. No. 4,493,557 (Nayak et al.). An optional feature, preferred for making higher quality flat glass, is that the stirring chamber may be integrated with a float forming chamber, whereby the glass in the stirring chamber rests on a layer of molten metal. The molten metal may be continuous with the molten metal constituting the support in the forming chamber, and is usually comprised essentially of tin.

The base glass of the present invention, that is, the major constituents of the glass without colorants, is commercial soda-lime-silica glass characterized as follows:

|  | Weight % |
|---|---|
| $SiO_2$ | 66–75 |
| $Na_2O$ | 12–20 |
| CaO | 7–12 |
| MgO | 0–5 |
| $Al_2O_3$ | 0–4 |
| $K_2O$ | 0–3 |

In addition to colorants and the $SO_3$ discussed above, other melting and refining aids may be present. Arsenic, antimony, fluorine, chlorine and lithium compounds are sometimes used, and small amounts may be detected in this type of glass.

The colorant portion of the glass consists essentially of:

|  | Weight % |
|---|---|
| Total iron (as $Fe_2O_3$) | Less than 0.02 |
| Se | 0.00003–0.0002 |
| CoO | 0–0.0003 |

The total amount of iron present in the glass is expressed herein in terms of $Fe_2O_3$ in accordance with standard analytical practice, but that does not imply that all of the iron is actually in the form of $Fe_2O_3$. For the purposes of the present invention, the total iron concentration of the glass is maintained below 0.02 percent by weight, preferably less than 0.015 percent. Minimizing the amount of iron present in the glass permits the luminous transmittance to be maintained high even though other colorants are present. High luminous transmittance results in bright coloration at the edge of a sheet of the glass. Also, the low iron content avoids the conventional green color. The only iron present is that which is introduced as impurity in some of the batch materials. Batch materials are selected for minimal iron contamination, but it would be difficult to reduce the total iron content of the glass below about 0.005 percent by weight without incurring considerable expense. Most of the preferred examples of the present invention contain from 0.008 to 0.012 percent by weight total $Fe_2O_3$. In particular, batch selection includes a low iron sand which, for example, may have an iron content of about 0.005 percent by weight iron analyzed as $Fe_2O_3$. Limestone and dolomite, conventional glass batch materials, are avoided because of their typical iron contamination. Instead, it is preferred to use a purer source of calcium such as aragonite, which is a mineral form of calcium carbonate with only about 0.01 percent by weight $Fe_2O_3$. A preferred alumina source is aluminum hydrate, with about 0.008 percent by weight $Fe_2O_3$. An example of a batch mixture that can be employed to produce a preferred example of the glass of the present invention is as follows:

| Batch Constituent | Parts by Weight |
|---|---|
| Sand | 1000 |
| Soda ash | 346.0 |
| Aragonite | 263.0 |
| Aluminum hydrate | 35.1 |
| Se | 0.0048 |
| $Co_3O_4$ | 0.0007 |

The batch formulation set forth above, when melted in accordance with the process described herein, yields the following glass composition:

EXAMPLE 1

|  | Weight % |
|---|---|
| $SiO_2$ | 73.07 |
| $Na_2O$ | 14.63 |
| CaO | 10.11 |
| MgO | 0.08 |
| $Al_2O_3$ | 1.80 |
| $K_2O$ | 0.01 |
| $Fe_2O_3$ | 0.010 |
| SrO | 0.21 |
| $SO_3$ | 0.015 |
| $ZrO_2$ | 0.028 |
| $Cr_2O_3$ | 0.0003 |
| Se | 0.0001 |
| CoO | 0.00005 |

Example 1 above has an attractive, bright, honey edge color and exhibits the following properties in transmittance at a standard thickness of 0.223 inches (5.66 millimeters):

| $LT_C$ | 88.8% |
|---|---|
| Dominant wavelength | 580 nanometers |
| Excitation purity | 1.11% |

Luminous transmittance ($LT_C$) is measured using C.I.E. standard illuminant C.

The following examples of the colorant portion of glasses of the present invention are more neutral in appearance than Example 1. Example 2 is a warm gray-brown color, and Example 3 is an almost neutral gray.

|  | Example 2 | Example 3 |
|---|---|---|
| Total iron (as $Fe_2O_3$) | 0.01% by weight | 0.01% by weight |
| Se | 0.00004 | 0.00007 |
| CoO | 0.00003 | 0.00025 |
| $LT_C$ | 89.5% | 88.25% |
| Dominant wavelength | 503 nanometers | 483 nanometers |
| Excitation purity | 0.04% | 0.02% |

Although not limited thereto, the glass of the present invention will most commonly be embodied by a flat sheet suitable for table tops, shelving, or other furniture components. Usually the sheet form will be made by the float process. A sheet of glass that has been formed by the float process (i.e., floated on molten tin) is characterized by measurable amounts of tin oxide that have migrated into surface portions of the glass on at least one side. Typically a piece of float glass has an $SnO_2$ concentration of at least 0.05% by weight in the first few microns below the surface that was in contact with the tin.

The desired wood-compatible coloration of the glasses of the present invention may vary somewhat in accordance with personal preference. The honey colored examples have been found to have color in transmittance characterized by dominant wavelengths in the range 570 to 590 nanometers. The most pleasing honey colored examples are considered to be those whose dominant wavelengths are in the range 578 to 582 nanometers. Luminous transmittance of this group of examples ranges from 88 to 89.5 percent. The selenium concentration of the honey colored examples may range from 0.00005 to 0.0002 percent by weight, and the CoO concentration may range from 0 to 0.0001 percent by weight. The selenium provides a pink or brown color to the glass, depending upon its oxidation state. It is an advantage of the process described herein that the oxidation state of the glass can be more readily controlled so as to render the glass relatively reducing, thereby inducing a larger portion of the selenium to be in the ferric selenide form which produces the brown color. Therefore, relatively reduced glass is desirable for achieving the wood tones of the present invention with less selenium. The oxidation state of glass may be expressed as the ratio of iron in the ferrous state (measured as FeO) to the total amount of iron in the glass (measured as $Fe_2O_3$), and the ratio in a relatively reduced glass may be greater than 0.4.

FeO and cobalt oxide both contribute blue color to alter the otherwise yellowish brown color. To simulate light colored wood no cobalt need be present and no measures need be taken to increase the amount of iron in the ferrous state, but for more simulating darker or more neutral tones these colorants are useful. Cobalt oxide in particular is useful in this combination because it renders the color of the glass more neutral, that is, it reduces the excitation purity. The effect of increasing the amount of cobalt oxide in the glass, as can be seen in Examples 2 and 3 is to render the appearance of the edge more gray and to lower the dominant wavelength. The dominant wavelengths of these more neutral colored examples are less than 500. By adjusting the relative amounts of the colorants, a full range of colors between each of the examples can be produced. No more than 0.0003 percent by weight cobalt oxide is used in the present invention to avoid unduly lowering the transmittance of the glass, thereby maintaining the brightness of the color at the edge.

The goal of providing the near absence of color when viewing normal to the surface of the glass sheet is attained by providing maximized luminous transmittance in the glass of the present invention. The luminous transmittance (illuminant C) of the glasses of the present invention is greater than 85 percent, preferably greater than 87 percent, and most preferably greater than 88 percent. The high transmittance also provides attractive, bright colors at the edges of the glasses. Due to the substantial absence of color in the glasses of the present invention, they exhibit excitation purity values well below 2.0 percent for the more colorful examples such as the honey color, and considerably lower (e.g., below 0.5 percent) for the more neutral colors.

Other variations and modifications known to those of skill in the art may be resorted to without departing from the scope of the invention defined by the claims that follow.

I claim:

1. Clear glass with edge coloration compatible with wood tones comprising a soda-lime-silica base glass comprising:

|  | Weight % |
|---|---|
| $SiO_2$ | 66-75 |
| $Na_2O$ | 12-20 |
| CaO | 7-12 |
| MgO | 0-5 |
| $Al_2O_3$ | 0-4 |
| $K_2O$ | 0-3 | and a colorant portion consisting essentially of:

| | |
|---|---|
| Total iron (as $Fe_2O_3$) | Less than 0.02 |
| Se | 0.00003–0.0002 |
| CoO | 0–0.0003 | whereby the glass exhibits luminous transmittance (illuminant C) of at least 85 percent at a thickness of 0.223 inches (5.66 millimeters), the colorant portion including all essential colorants in the glass.

2. The glass of claim 1 wherein the total iron oxide content of the glass is less than 0.015 percent by weight of the glass expressed as $Fe_2O_3$.

3. The glass of claim 1 wherein the glass exhibits a luminous transmittance of at least 87 percent.

4. The glass of claim 1 wherein the glass exhibits a dominant wavelength in transmission of 570 to 590 nanometers.

5. The glass of claim 1 wherein the glass exhibits a dominant wavelength in transmission of 578 to 582 nanometers and has a honey color at the edges of a sheet.

6. The glass of claim 1 wherein the excitation purity in transmission is less than 2.0 percent.

7. The glass of claim 1 wherein the excitation purity is less than 0.5 percent and has a nearly neutral color at the edges of a sheet.

* * * * *